United States Patent [19]

Manassa

[11] Patent Number: 5,441,786

[45] Date of Patent: Aug. 15, 1995

[54] WOOD FLOORING SYSTEM

[76] Inventor: Michael Manassa, Unit 4 3 St. Ninians Road, Brighton Victoria 3186, Australia

[21] Appl. No.: 220,842

[22] Filed: Mar. 31, 1994

[51] Int. Cl.⁶ .................................................. B32B 3/16
[52] U.S. Cl. .................................. 428/50; 428/318.4; 52/390
[58] Field of Search ................ 428/50, 44, 455, 318.4; 52/390, 480, 393

[56] References Cited

U.S. PATENT DOCUMENTS 3,902,293  9/1975  Witt et al. ............................ 428/44

FOREIGN PATENT DOCUMENTS 69237  3/1992  Japan ..................................... 428/50

*Primary Examiner*—Alexander S. Thomas
*Attorney, Agent, or Firm*—Madson & Metcalf

[57] ABSTRACT

A flooring system including a first layer comprising a cushioning material with structural integrity, a second layer comprising a material adapted to receive a third layer comprising wooden boards wherein the second layer is adhered to the first layer and the third layer is adhered to the second layer.

12 Claims, 1 Drawing Sheet

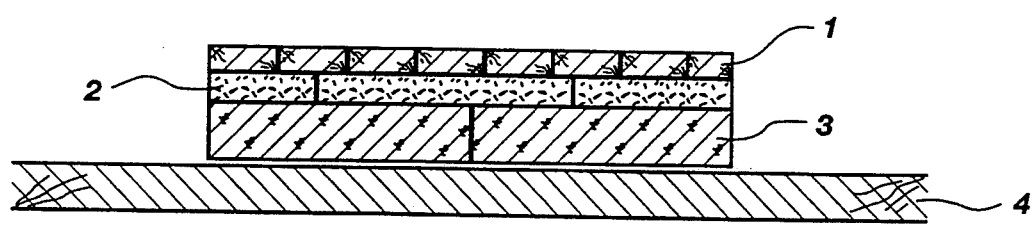
Fig. 1
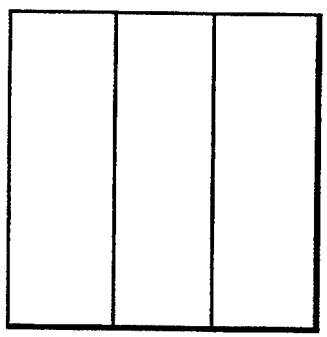 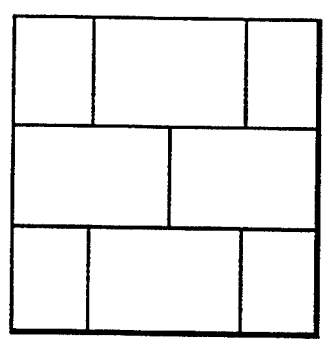 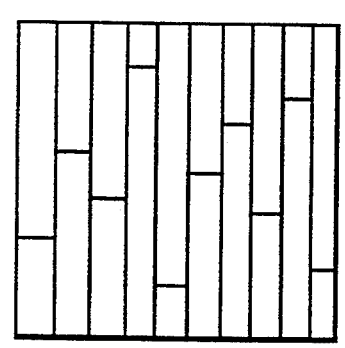
Fig. 2a    Fig. 2b    Fig. 2c

WOOD FLOORING SYSTEM

BACKGROUND OF THE INVENTION

This invention relates to wood flooring systems for use on sub floors.

Wood flooring systems have been placed on sub floors for many years. This flooring system generally comprises floor boards which are nailed or glued to the sub floors. The disadvantage of having a floor system consisting only of wood is that a great deal of noise is generated when one walks across it wearing shoes.

The present invention aims to minimize the disadvantages of using wood alone as a flooring material.

SUMMARY OF THE INVENTION

The present invention therefore provides a flooring system including a first layer comprising a cushioning material with structural integrity, a second layer comprising a material adapted to receive a third layer comprising wooden boards wherein the second layer is adhered to the first layer and the third layer is adhered to the second layer.

The invention therefore enables a flooring system to be formed which can utilize at least three types of materials which absorbs pressure and thus minimizes sound and is capable of use on a broad range of sub floors including concrete, chipboard and ceramics.

Preferably the second layer is oriented at right angles to the first layer.

Preferably the first layer is a cushioning material with structural integrity such as cork, foam, an elastomeric substance such as rubber, or similar material having a thickness of about 2 to about 4 mm.

Preferably the second layer is masonite (fiberboard made from steam-exploded wood fiber) having a thickness of about 2.5 mm.

Preferably the wooden boards have a thickness of about 5 or 6 mm and a width of between 60 to 70 mm.

BRIEF DESCRIPTION OF THE DRAWINGS

One preferred embodiment will now be described with reference to the accompanying drawings in which:

FIG. 1 represents a cross-sectional side view of the flooring system placed upon a sub floor.

FIGS. 2a, 2b, and 2c represent top views of the orientation of the three layers.

DETAILED DESCRIPTION

Referring to the drawings there is shown a first layer comprising wooden length boards 1 adhered to a second layer comprising a masonite layer 2 which is in turn adhered to a third layer comprising a cork layer 3. The cork layer has structural integrity in that it can withstand its own weight and the weight of people walking upon it or articles resting upon it. In essence, the cork layer can withstand reasonable force. The cork layer rests upon sub floor 4 so as to better absorb pressure and force exerted by a person walking across the wooden boards. Cork also acts as a natural insulator.

Referring in particular to FIG. 2a, 2b, and 2c, the masonite layer 2 shown in FIG. 2a is installed in sheets is orientated at right angles to the cork layer 3 shown in FIG. 2b which is laid either in sheet form in parallel lengths or squares laid in brick fashion. The wooden board layer 1 shown in FIG. 2c is a layer of parallel strips of wood which is laid in the usual fashion in the trade. The boards are preferably pre-sanded, pre-glued, pre-colored and pre-sealed.

The adhesion between layers 1 and 2 and between layers 2 and 3 can be by any known or novel means but is preferably either by solvents or water based contact adhesives and the wooden boards are preferably finished with a recommended solvent or water based coating.

The claimed invention is:

1. A flooring system including a first layer comprising a cushioning material with structural integrity, a second layer comprising masonite having a thickness of about 2.5 mm and adapted to receive a third layer comprising wooden boards wherein the second layer is adhered to the first layer and the third layer is adhered to the second layer.

2. A flooring system as claimed in claim 1 wherein the first layer cushioning material is oriented in a longitudinal direction and wherein the second layer masonite is orientated in a longitudinal direction at right angles to the first layer.

3. A flooring system as claimed in claim 1 wherein the first layer is cork having a thickness of about 2 to about 4 mm.

4. A flooring system as claimed in claim 1 wherein the first layer is foam.

5. A flooring system as claimed in claim 1 wherein the first layer is an elastomeric substance.

6. A flooring system as claimed in claim 5 wherein the elastomeric substance is rubber.

7. A flooring system as claimed in claim 1 wherein the wooden boards have a thickness of about 5 or 6 mm and a width of between 60 to 70 mm.

8. A flooring system including a first layer comprising a cushioning material with structural integrity having a thickness of about 2 to about 4 mm, a second layer orientated at right angles to the first layer having a thickness of about 2.5 mm, the second layer comprising masonite, and a third layer comprising wooden boards having a thickness of about 5 or 6 mm and a width of between 60 to 70 mm, wherein the second layer is adhered to the first layer and the third layer is adhered to the second layer.

9. A flooring system as claimed in claim 8 wherein the first layer is cork.

10. A flooring system as claimed in claim 8 wherein the first layer is foam.

11. A flooring system as claimed in claim 8 wherein the first layer is an elastomeric substance.

12. A flooring system as claimed in claim 11 wherein the elastomeric substance is rubber.

* * * * *